P. C. INGERSOLL.
MEANS FOR BALING MANURE.
No. 185,106. Patented Dec. 5, 1876.
Fig: 1.
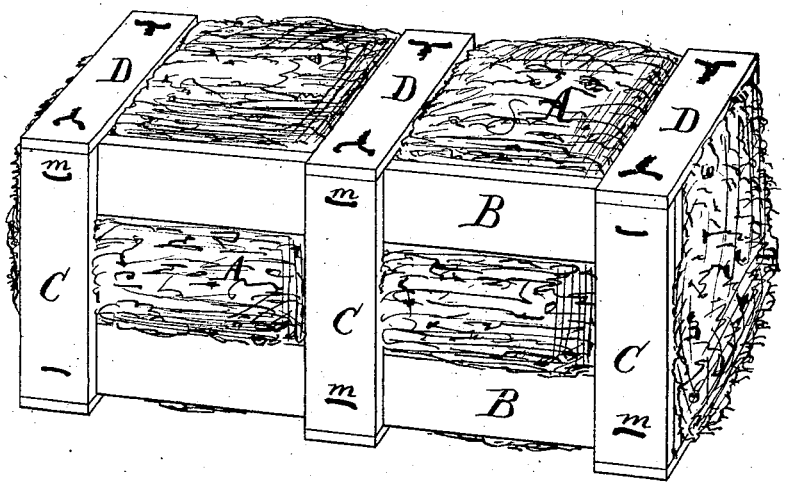
Fig: 2.     Fig: 3.     Fig: 4.
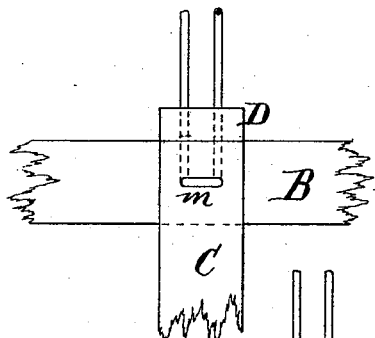 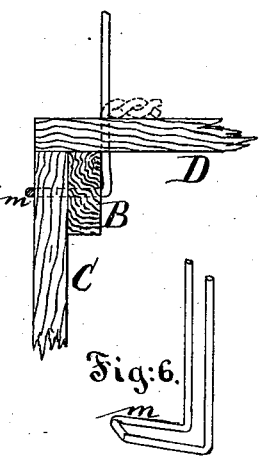 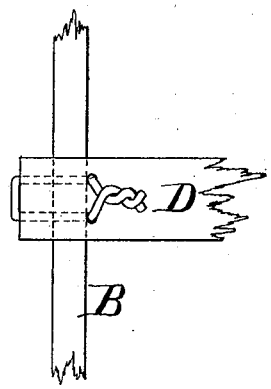
Fig: 5.     Fig: 6.
Witnesses:
A. Henry Gentner
H. Clay Smith
Inventor:
P. C. Ingersoll
by his attorney
J. D. Stetson

UNITED STATES PATENT OFFICE.

PLATT C. INGERSOLL, OF BROOKLYN, E. D., NEW YORK, ASSIGNOR TO BERNARD ACKERMAN, OF NEW YORK CITY.

IMPROVEMENT IN MEANS FOR BALING MANURE.

Specification forming part of Letters Patent No. 185,106, dated December 5, 1876; application filed September 30, 1876.

*To all whom it may concern:*

Be it known that I, PLATT C. INGERSOLL, of Brooklyn, E. D., in the county of Kings and State of New York, have invented certain new and useful Improvements relating to Means for Baling Manure, of which the following is a specification:

Stable-manure, containing the ordinary proportions of straw, has some tenacity when compressed together, but not sufficient to form bales which will retain for a long period sufficient strength for convenient handling. Baled manure shrinks after a few weeks, and when put up with simple bands is liable to come to pieces.

I provide for baling manure in frames composed mainly of wood, presenting a large amount of surface, but yet sufficiently open to allow efficient ventilation. The material is cheap and strong, and supports the weak material with broad bands extending both around the bale and longitudinally thereof.

My frames may be put together to inclose a bale in a press with little delay and with cheap labor. The principal portions may be used over and over many times.

In some parts of the country where sawdust is available, it is largely used as a litter for animals, with only a small proportion of straw or the like. My invention applies well with such material.

The following is a description of what I consider the best means of carrying out the invention.

The accompanying drawings form a part of this specification.

Figure 1 is a perspective view of a bale with the inclosing-frame complete, laid on its side. The additional figures represent details on a larger scale. Fig. 2 is a plan view of a portion of the top frame, with an end view of the adjacent side piece, and with the fastening-wires not secured. Fig. 3 is a section of the same. Dotted lines in Fig. 3 show the projecting ends of the fastening-wires twisted together and bent down against the side piece, indicating the fastened condition. Fig. 4 is a side view of the same parts with the fastening secured. Fig. 5 represents one of the staple-formed wires, which I employ as fastenings, in the shape in which it is first manufactured. Fig. 6 is a perspective view of the same after being applied in the top or bottom frame, and bent into position to receive the side pieces.

Similar letters of reference indicate corresponding parts in all the figures.

A is the material to be baled, which will be ordinarily stable-manure mingled with more or less straw, or other litter tending to give it coherence. B B are longitudinal pieces, and C C are cross-pieces, of the top frame. Short lengths of wire $m\ m$ are bent by machinery, or otherwise, to form a staple, as shown in Fig. 5. This staple is applied through holes in the frame B C. It will be understood that a similar frame is placed at the bottom of the bale, and that after the material A has been pitched into a suitable box-press the top frame is laid thereon, and the whole subjected to pressure. When the material A is sufficiently compressed the sides of the press are removed, and the perpendicular walls of the material A, which are thereby presented, are partially covered by side pieces D D, which have been previously bored with holes adapted to receive the ends of the wires $m$, which match therein, and the projecting ends of the wires are tightly twisted together. The pressure of the press being now removed, and the platen lifted, the bale is removed and a new bale-frame being placed on the bed, and the sides again replaced, the whole is ready for a repetition of the operation.

Nails or any ordinary fastenings may be employed to hold the cross-pieces C permanently to the longitudinal pieces B.

The material of the long strips B and the cross-pieces C, as also of the side pieces D, may be ordinary inch board.

The material A, by its nature, expands but little after the compression is released. That little tends to bring the material outward in the spaces between the pieces of board to an extent about equal to their thickness. There are invariably considerable spaces along the edges of the boards, in which the air may circulate freely, so that in case freshly-made bales are piled ever so regularly in a yard, on a barge, or the like, the air has sufficient access to effect a thorough ventilation.

Fresh stable-manure is, in many respects, unlike ordinary material that is packed in bales. Its peculiar nature and conditions require it, when put into commercial shape, to be protected in a manner exactly adapted thereto.

In my invention the strips of wood, which extend around the bale at each end, protect the corners from being broken and crumbling off while being handled. My bales can be piled upon each other in store-houses or yards, and in cars and vessels, without danger of compressing each other out of shape, or breaking any of the bales.

I claim as my invention—

1. The bale or package described, composed of the compressed fertilizing material A, inclosed within broad strips B C D, of wood, as shown, and as herein specified.

2. The fastening-wires $m$, set in the frames B C, adapted to secure the side pieces D, substantially as and for the purposes herein specified.

In testimony whereof I have hereunto set my hand this 14th day of September, 1876, in the presence of two subscribing witnesses.

PLATT C. INGERSOLL.

Witnesses:
 THOMAS D. STETSON,
 A. HENRY GENTNER.